United States Patent
Sato

[15] 3,653,311
[45] Apr. 4, 1972

[54] SHOCK ABSORBER (SHOCK ISOLATION DEVICE) FOR MIRROR OF SINGLE-LENS REFLEX CAMERA

[72] Inventor: Akihiko Sato, Tokyo, Japan
[73] Assignee: Nippon Kogaku K.K., Tokyo, Japan
[22] Filed: Mar. 13, 1970
[21] Appl. No.: 19,336

[30] Foreign Application Priority Data
Mar. 27, 1969 Japan..................................44/26697

[52] U.S. Cl.................................................................95/42
[51] Int. Cl.............................................................G03b 19/12
[58] Field of Search.....................................................95/42

[56] References Cited

UNITED STATES PATENTS 3,304,848  2/1967  Steisslinger.............................95/42

Primary Examiner—Samuel S. Matthews
Assistant Examiner—E. M. Bero
Attorney—Marn & Jangarathis

[57] ABSTRACT

A shock absorber assembly for a hinged mirror of a single-lens reflex camera for reducing the noise and shock caused by the downward movement of the mirror. The absorber assembly is disposed at a position where the mirror is held stationary when the mirror is lowered. When the mirror is lowered it engages with the absorber assembly with the downward impact energy of the mirror being absorbed as friction between a drum and a coil spring. The mirror stops after it passes over its regular reflecting position and then is caused to return to its regular reflecting position by the action of a return spring.

1 Claim, 3 Drawing Figures

Patented April 4, 1972

3,653,311

SHOCK ABSORBER (SHOCK ISOLATION DEVICE) FOR MIRROR OF SINGLE-LENS REFLEX CAMERA

BACKGROUND OF THE INVENTION

The present invention relates to a shock absorber assembly for a hinged flap mirror of a single-lens reflex camera. When the hinged mirror of a single-lens reflex camera is lowered to its light reflecting position, noise and shock result which effect the performance of the camera. In a conventional shock absorber for the hinged mirror, the noise may be reduced to some extent by use of a spring or the like, alone, but in this case, the mirror is not readily reset to its regular position as a result of the bounce caused by the spring. Other conventional shock absorbers for hinged mirrors of single-lens reflex cameras using means other than springs have drawbacks of producing noise and shock when the mirrors are lowered to the reflecting position.

SUMMARY OF THE INVENTION

In view of the above, the primary object of the present invention is to eliminate the defects encountered in the conventional shock absorbers assemblies of the type described hereinabove.

In brief, the present invention provides an improved shock absorbing mechanism for mirror of single-lens reflex camera. A mirror engaging member which is adapted to engage with the mirror and a spring stop member made integral with said mirror engaging member are disposed on a fixed drum in such a relationship that they hold a common axis with the former being able to rotate about the axis at a position when the mirror is to be lowered. One end of a spring which is wound around the outer circumference of the fixed drum is affixed to the spring stop member and serves as a slide spring between the spring stop member and the fixed drum. The slide spring tightens on the fixed drum when the mirror is moved downwardly whereas the spring makes an idle run about the fixed drum in the reverse direction. A return spring is disposed between a stationary portion of the camera and the mirror engaging member or the spring stop member so that the mirror may be returned to its regular reflecting position by the force of the return spring and the slide spring may be returned to its initial position. When the mirror is being lowered, the downward impact energy thereof is converted and absorbed as the frictional energy between the slide spring and the fixed drum, and after the mirror has passed over its reflecting position, the mirror can be returned to said regular reflecting position.

DESCRIPTION OF THE PREFERRED EMBODIMENT

Figure 1:
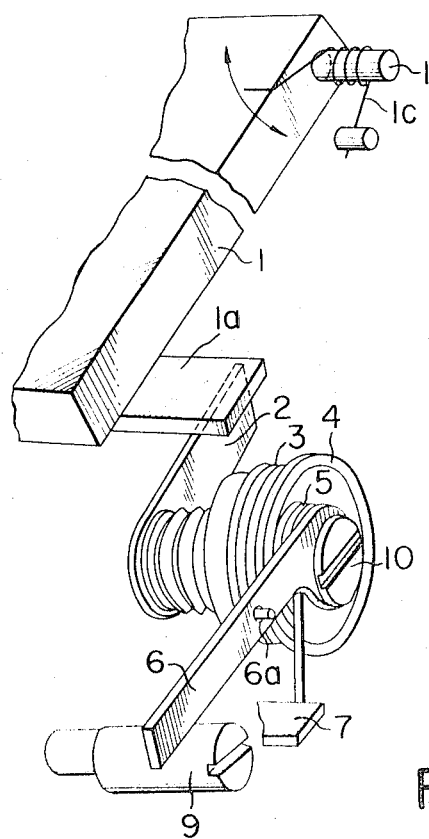
FIG. 1 is a partial isometric view of one embodiment of the present invention.
Figure 2:
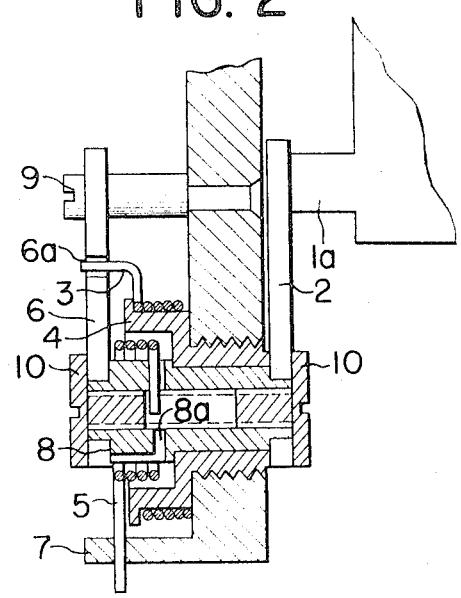
FIG. 2 is a sectional view thereof.

Prior to the detailed description of the preferred embodiment of the invention, the construction and function of a slide spring used in the present invention will be described for the better understanding hereof. The function of a "so-called" free wheel clutch is different depending upon the direction of rotation. When the clutch is rotated in the direction of winding of the spring, the spring is gradually wound around a shaft until it becomes tightly wound about the shaft when they become as one body. When the rotation of the free wheel clutch is reversed, the spring makes an "idle" run around the shaft. The free wheel clutch type slide spring used in the present invention is such that when it is turned in the direction of its winding, the spring is gradually wound tightly around the shaft until when a further force is applied to the spring in the same direction, the spring is caused to slide about the shaft. When such a spring is turned in the opposite direction, the spring makes an "idle run" about the shaft as in the case of the above described free wheel clutch.

Referring now to the drawings, a hinged mirror 1 rotates about a pivot 1b and is biased by means of a spring 1c so as to normally rotate in a counterclockwise direction. A projection 1a extended from the reflecting mirror 1 engages with a mirror engaging member 2 when the mirror 1 is moved downwardly. Both the mirror engaging member 2 and the spring stop member 6 are carried by a shaft 8 to rotate in unison. The shaft 8 is journalled by a stationary portion 7 of a camera (not shown) through a fixed drum 4 over which is wound a slide spring 3 of the type hereinabove described. One end of the slide spring 3 is fixed in a hole 6a of the spring stop member 6 while the other end of the spring 3 is free around the fixed drum 4. A returning spring 5 is loosely wound around the shaft 8 with one end of the spring 5 being fixed to the stationary portion 7 of the camera, with the other end being fitted into a notch 8a of the shaft 8. A stopper pin 9 for adjusting the reflecting position of the reflecting mirror 1 is eccentrically disposed so that the position of the mirror engaging member 2 can be suitably adjusted. Both the mirror engaging member 2 and the spring stop member 6 are securely fixed to the shaft 8 by means of a stop screw 10.

Figure 3:
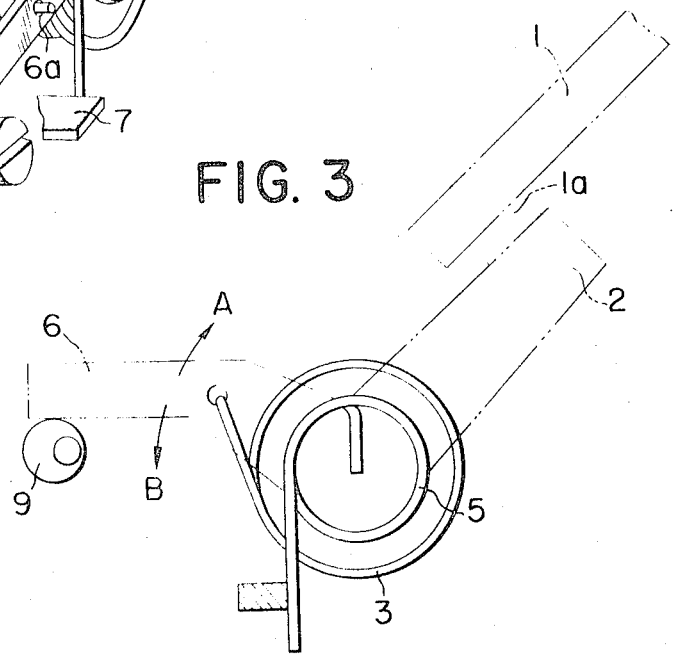
FIG. 3 is a side view thereof.

In operation, when the mirror 1 is caused to move downwardly, the projection 1a contacts the mirror engaging member 2 so that the spring stop member 6 is caused to rotate whereby the slide spring 3 is caused to rotate or wind about the fixed drum 4 in the direction indicated by the arrow A in FIG. 3 (in the direction in which the torque is increased). The slide spring 3 slides around the fixed drum 4 so that a portion of the kinetic energy of the downward movement of the mirror 1 is absorbed or converted into friction between the slide spring 3 and the fixed drum 4. The return spring 5 is also caused to rotate or wind together with the shaft 8 during rotation of the spring stop member 6, thereby compressing the return spring 5 by absorption of another portion of the kinetic energy of the downward movement of the mirror 1.

Thereafter, the return spring 5 causes the spring stop member 6 to rotate in the direction indicated by the arrow B in FIG. 3 (in the direction in which the torque in less) until the spring stop member 6 engages the stopper pin 9 thereby setting the position of the mirror at its regular reflecting position. It should be noted that the torque produced by the return spring 5 must be greater than the torque (if any) in the returning direction of the slide spring 3 and the torque produced by the spring 1c of the mirror 1.

By the device in accordance with the present invention, the shock produced when the mirror is lowered is effectively absorbed so that the noise level is extremely reduced. Furthermore, the mirror can be rapidly reset to its regular reflecting position.

The present invention has been so far described with particular reference to one illustrative embodiment thereof, but it will be understood that variations and modifications can be effected without departing from the true spirit of the present invention as described hereinabove and as defined in the appended claim.

I claim:

1. A shock absorber assembly for a hinged-flap mirror of a single-lens reflex camera, the combination comprising:
   a drum secured to the body of the camera,
   a stop member provided on the body of the camera;
   a lever means disposed on said drum and having a first member extending into the reflecting position in the locus of said mirror for engagement with the mirror and a second member engageable with said stop member, said lever means being movable from a first position wherein said second member engages said stop member and said first member engages said mirror, to a second position, wherein said second member is disengaged from said stop member and said first member is removed together with said mirror from said reflecting position;
   a slide spring tightly wound about said drum, one end of which is fixed to said lever means and the other end free, said slide spring and drum effecting a large frictional force therebetween when the said slide spring slides about said drum in one direction when said lever means moves from said first position to said second position thereof and effecting a small frictional force when moved in the opposite direction; and spring means for biasing said lever means toward said first position, said spring means having a force greater than said small frictional force.

* * * * *